May 20, 1958　　　A. W. WOODWARD　　　2,835,303
RIM STRUCTURE
Filed Oct. 31, 1955

*INVENTOR.*
ALVA W. WOODWARD
BY
*R. L. Miller*
ATTORNEY

United States Patent Office 2,835,303
Patented May 20, 1958

2,835,303

RIM STRUCTURE

Alva W. Woodward, Kent, Ohio, assignor to The Goodyear Tire & Rubber Company, Akron, Ohio, a corporation of Ohio Application October 31, 1955, Serial No. 543,683

1 Claim. (Cl. 152—410)

This invention relates to rims and more particularly to multiple piece rims for use with large size tubeless tires.

The use of tubeless tires has expanded rapidly so that they are now used on wheels for all types of vehicles. The large earthmover and off-the-road tires present a particularly difficult problem because the operations require that different cross-section tires be used on the same rim depending upon the particular service requirements. In order to accommodate the various tires, it is essential that the rims are adapted to receive different side rings. This requires that the side rings be separate so that they may be interchanged when desired. When mounting a tubeless tire on a rim with loose side rings, the joint between the side ring and the adjacent rim structure must be effectively sealed as the present rim seals do not provide a seal for the joints in these rim sections.

Tires of these types are relatively difficult to mount and dismount so that it is essential that any rim structure used for tubeless tires will not create additional difficulties in the mounting and dismounting operations. The loose side flange rings are of assistance in manipulating the large, rigid bead portions of these tires and in preventing possible damage to the tires during mounting and dismounting.

In any tubeless tire and rim assembly, no difficulty is encountered in effecting a seal between the tire and the rim. It has been determined also that the primary seal is effected between the side flange and adjacent bead portions of the tire. The seal, if any, created between the radial inner surface of the bead and the bead seat portion of the rim cannot be depended upon because no force is present to constantly urge the rim and bead surfaces together in sealing relation. Resultingly, positive sealing means are required to seal the joints between the various rim parts. It is therefore an object of this invention to provide a multiple piece rim that may be used with large size tires that require loose side flange rings.

Another object of this invention is to provide a rim structure that requires only modifications of a minor nature from that of the rim used for the conventional tire and tube.

A still further object of the invention is to provide a rim that permits a tire and tube to be mounted or dismounted in the usual manner.

A general object of this invention is to provide a rim structure that is interchangeable with the present rim.

Other objects and advantages of this invention will become apparent hereinafter as the description thereof proceeds, the novel features, arrangements and combinations being clearly pointed out.

Figure 1:
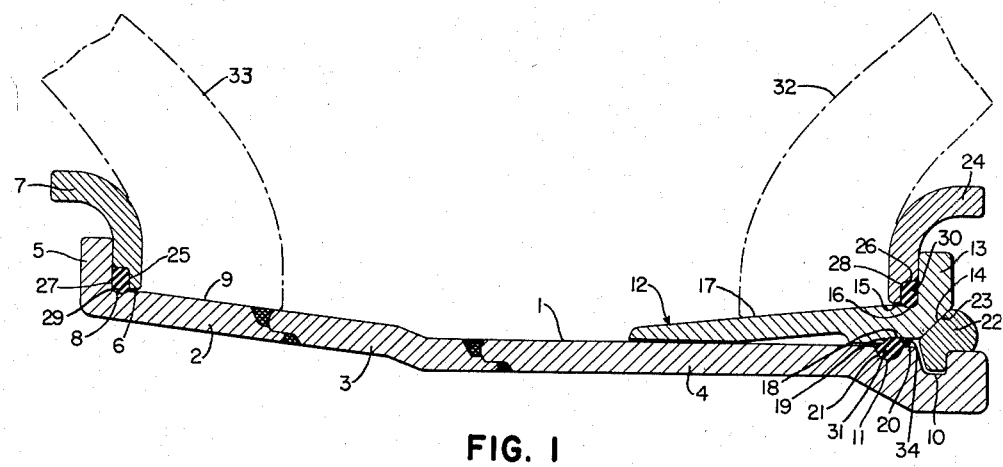
Fig. 1 is a cross-section of a typical rim of the invention.
Figure 2:
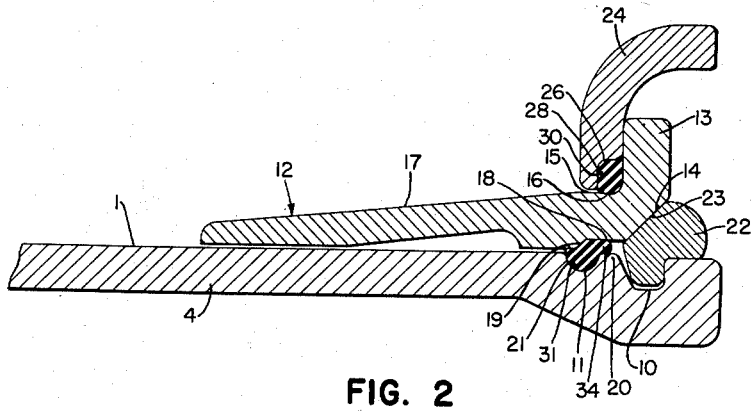
Fig. 2 is an enlarged partial section of the rim of Fig. 1.

As shown in Fig. 1, the rim base 1 is fabricated in the conventional manner from circled rolled sections 2, 3 and 4 joined together by welding to form a unitary structure. Depending upon the specific details, rim base 1 may be formed by circling a single rolled section or from two rolled sections welded together. These practices are well known in the rim art. Along one edge of the rim base 1 a side ring retaining flange 5 extending radially outwardly from the rim base 1 is formed. Immediately adjacent the inner face of the retaining flange 5, a generally cylindrical side ring seat 6 is provided to support the inner periphery of the endless side ring 7 and preferably includes an arcuate shaped depression 8 along the lateral outer portion of the seat 6. A beveled tire bead seat 9 extends laterally inwardly from the seat 6 with the bevel decreasing in diameter in the direction away from the seat 6. The bevel of the bead seat 9 generally conforms to the bevel of the tire bead to provide firm and positive support of the tire on the rim.

Along the opposite edge of the rim base 1 an integral radially outwardly facing gutter is provided and includes a locking flange along the outer edge thereof. Laterally inwardly of the gutter 10 on the surface of the rim base, is a seal retaining groove 11 with the outermost extremity of the groove spaced a short distance inwardly from the edge of the gutter 10.

Associated with the gutter 10 of the rim base is an endless bead seat ring 12 having an internal diameter of a size slightly larger than the outer diameter of the rim base 1 so that it will slide laterally on and off the base portion. Along the lateral outer edge of the bead seat ring 12 is a radially outwardly extending side ring retaining flange 13 and an inclined ring mounting surface 14. The radial outer surface of the bead seat ring 12 includes a generally cylindrical side ring seat portion 15 immediately adjacent the flange 13 with preferably a depression or arcuate recess 16 formed in the seat 15 immediately adjacent the flange 13. A beveled tire bead seat 17 extends laterally inwardly from the side ring seat 15 with the bevel of the seat 17 being of decreasing diameter in the direction away from the seat 15.

The lateral outer portion of the radial inner face of the bead seat ring 12 is recessed as at 18 to form the radially outwardly facing shoulder 19 lying over the groove 11 when the bead seat ring 12 is in the assembled position. The recessed portion 18 is spaced from the portion 20 of the base 1 between the gutter 10 and the groove 11 so that the chamber 21 formed therebetween is open-sided.

A split locking ring 22 of the cross-sectional contour shown having a portion complementary to the gutter 10 is adapted to snap into and out of the gutter to lock the bead seat ring 12 into position. The beveled portion 23 of the lock ring 22 engages the mating beveled portion 14 of the bead seat ring 12 to firmly and positively lock and center the bead seat ring 12 in position with respect to the rim base 1.

The endless side rings 7 and 24 engaging the flanges 5 and 13 respectively are of the usual construction with the inner periphery being of a slightly larger diameter than that of the seats 6 and 15 to permit free lateral movement of the side rings on and off the seats 6 and 15 respectively. The side rings 7 and 24 are held against the flanges 5 and 13 by the tire beads when the tire is mounted on the rim. Recesses 25 and 26 on the radial inner and lateral outer portion of the side rings 7 and 24 respectively form with the adjacent portions of the base 1 and bead seat ring 12 enclosed chambers 27 and 28. The recesses 25 and 26 in the side rings 17 and 24 overlie the recesses 8 and 16 respectively in the side ring seats 6 and 15.

The chambers 27 and 28 as illustrated, are substantially rectangular in cross-section but may be of any desired section. For example, the corners of the side rings 7 and 24 may be champfered or arcuately shaped to provide differently contoured chambers. The contour must provide sufficient distortion to create a positive seal when the sealing element is mounted therein.

In order to seal the joints between the component parts of the rim structure, a sealing element 29, 30 and 31 preferably in the form of an annulus of elastic deformable material such as rubber or plastic is positioned in each of the chambers 21, 27 and 28 respectively. Each of the sealing elements may be of any cross-sectional shape, but a sealing element of circular cross-section will provide a very satisfactory seal for the rim structure illustrated. It is desirable that the sealing element be tensioned slightly when it is positioned on the rim so that it may remain in position as the rim is assembled. The depressions 8 and 16 in the side ring seats 6 and 15 respectively provide assistance in maintaining the sealing elements 29 and 30 in position while the rim is being assembled. The sealing element 31 is maintained in position during the rim assembly by the groove 11. As illustrated, each of the sealing elements 29, 30 and 31 are similar, but it is to be understood that different sizes and shapes may be used for each of these sealing elements if the particular rim structure requires it. In each instance the sealing element is of such size and shape so as to be sufficiently distorted by the assembled rim parts to effect a lasting airtight seal between the adjacent rim parts.

It is believed that the manner of assembling the rim structure is obvious from the foregoing description. However, briefly, with all of the rim parts removed from the base, the sealing element 29 is placed in position in the depression 8. The side ring 7 is then moved laterally onto the base until it is approximately in place against the retaining flange 5. A tire is then placed on the base 1. The bead seat ring 12 and side ring 24 are assembled by placing the sealing element 30 in the depression 16 of the bead seat ring 12 and then moving the side ring 24 laterally onto its seat 15 until it is in approximate position against the flange 13. This assembly then is moved laterally onto the rim base with the bead seat portion 17 of the bead seat ring 12 extending under the tire bead 32 to move the bead inwardly toward the other bead 33 until the groove 11 is exposed. The sealing element 31 is then placed in position in the groove 11. The split locking ring 22 is then snapped into position in the gutter edge 10. Inflation of the tire through the valve (not shown) in the rim base then causes the tire beads 32 and 33 to move outwardly onto their respective seats. This in turn moves the side rings and bead seat ring laterally outwardly to the assembled position. During this movement, the sealing elements 29 and 30 in chambers 27 and 28 are distorted to effect an airtight seal between the side rings and adjacent rim parts. At the same time, the shoulder portion 19 of the bead seat ring 12 distorts the sealing element 31 in the groove 11 to cause a portion 34 of the sealing element 31 to occupy a portion of the space between the recess 18 and the surface 20, thus creating a positive permanent airtight seal at this point. In order to remove a tire from the rim, the operations are reversed, and if this is done it is desirable to replace the sealing elements 29, 30 and 31 before reassembling the rim.

From the foregoing description it will be recognized that the rim structure provides an inexpensive, simple and effective seal for a multi-part rim with loose side rings. A rim structure of this type does not require major changes in the rim sections but only slight modifications to the present sections. The chambers formed to receive the sealing elements are of a pre-determined size and subject the sealing elements to definite stresses upon assembly of the rim. Each of the sealing elements contact only continuous surfaces and, therefore, are not subject to abrasion by any parts of the rim.

While certain representative embodiment and details have been shown for the purposes of illustrating the invention, it will be apparent to those skilled in the art that various changes and modifications may be made without departing from the spirit or scope of the invention.

Having thus fully described my invention, what I claim and desire to secure by Letters Patent of the United States is:

A separable rim assembly for tubeless tires comprising an endless annular rim base having a side ring retaining flange formed integrally with and extending radially outwardly from one side of the rim base; a cylindrical seat formed in said base adjacent said flange with an annular depressed portion in said cylindrical seat immediately adjacent said flange; a beveled annular bead seat formed laterally inwardly adjacent the cylindrical seat and decreasing in diameter in the direction away from the flange; an endless tire bead retaining side ring removably supported on the cylindrical seat against the retaining flange and adapted to be displaced laterally over the bead seat portion of the base when mounting and dismounting a tire, with an annular recess formed on the radially inner and laterally outer portion of said side ring forming an enclosed annular chamber with said depressed portion of said cylindrical seat and retaining flange of said rim base; a radially outwardly facing channel formed in the rim base along the opposite side thereof; a radially extending locking flange formed integrally with said opposite side and forming the outer side of said channel; a radially outwardly facing groove in said base adjacent to and laterally inwardly spaced from said channel; a demountable endless bead seat ring having the laterally inner portion of the radially inner surface thereof adapted to move laterally inwardly of the channel over the base, the laterally outer portion of the radially inner face being recessed radially outwardly to form an axially outwardly facing shoulder overlying the groove when in the assembled position and provide a space between the portion of the base between said groove and channel and the inner face of the bead seat ring when the rim is in the assembled position, said recessed portion of the bead seat ring and groove cooperating to form an axially outwardly facing open-sided chamber; a beveled bead seat formed on the radially outer periphery of the bead seat ring with the bevel decreasing in diameter in a direction opposite to the bevel of the bead seat formed on the rim base and an integral side ring retaining flange extending radially outwardly along the axial outer edge thereof; and a cylindrical seat formed laterally outwardly intermediate the beveled seat and retaining flange of the bead seat ring with an annular depressed portion immediately adjacent said flange in said cylindrical seat; a second endless tire bead retaining side ring removably supported on the cylindrical seat of the bead seat ring and adapted to be displaced laterally over the bead seat portion of the bead seat ring when mounting and dismounting a tire with an annular recess formed on the radially inner and laterally outer portion of said side ring forming an enclosed annular chamber with said depressed portion of said cylindrical seat and retaining flange of said bead seat ring; a transversely split locking ring having a locking portion removably seated in the channel in the rim base and a portion in engagement with the bead seat ring to maintain the bead seat ring in position with respect to the base, the locking flange of said channel preventing laterally outward displacement of the locking ring and a resilient deformable sealing element in each of said chambers under axial and radial distortion to effect an airtight seal between the rim parts cooperating to form the chambers.

References Cited in the file of this patent

FOREIGN PATENTS

| 253,119 | Italy | May 10, 1927 |
| 725,767 | Great Britain | Mar. 9, 1955 |